(12) United States Patent
Nam et al.

(10) Patent No.: US 11,993,448 B2
(45) Date of Patent: May 28, 2024

(54) ELECTRIC VEHICLE BATTERY TRANSPORTATION CONTAINER HAVING SHIELD SLEEVE

(71) Applicants: HYUNDAI GLOVIS CO., Ltd., Seoul (KR); NPC CO., Ltd., Ansan-si (KR)

(72) Inventors: Woo Suck Nam, Seoul (KR); Oh Seong Kim, Uiwang-si (KR); Jong Dai Park, Gunpo-si (KR)

(73) Assignees: HYUNDAI GLOVIS CO., LTD., Seoul (KR); NPC CO., LTD., Ansan-si (KR)

( * ) Notice: Subject to any disclaimer, the term of this patent is extended or adjusted under 35 U.S.C. 154(b) by 64 days.

(21) Appl. No.: 17/870,774

(22) Filed: Jul. 21, 2022

(65) Prior Publication Data

US 2023/0031585 A1  Feb. 2, 2023

(30) Foreign Application Priority Data

Jul. 28, 2021  (KR) .......................... 10-2021-0099208

(51) Int. Cl.
| | |
|---|---|
| *B65D 85/68* | (2006.01) |
| *B65D 6/00* | (2006.01) |
| *B65D 21/02* | (2006.01) |
| *H01M 50/24* | (2021.01) |
| *H01M 50/249* | (2021.01) |
| *H01M 50/264* | (2021.01) |
| *H01M 50/291* | (2021.01) |

(52) U.S. Cl.
CPC .............. *B65D 85/68* (2013.01); *B65D 11/10* (2013.01); *B65D 21/0212* (2013.01); *H01M 50/24* (2021.01); *H01M 50/249* (2021.01); *H01M 50/264* (2021.01); *H01M 50/291* (2021.01); *B65D 2585/88* (2013.01); *H01M 2220/20* (2013.01)

(58) Field of Classification Search
CPC ................ B65D 85/68; B65D 2585/68; B65D 2585/6802; B65D 2585/6875; B65D 19/44; B65D 19/385; B65D 21/0212; B65D 2585/88; H01M 50/249
USPC ................................ 206/319, 386, 600, 703
See application file for complete search history.

(56) References Cited

FOREIGN PATENT DOCUMENTS

KR        102201715  B1      1/2021

*Primary Examiner* — Steven A. Reynolds
(74) *Attorney, Agent, or Firm* — Rabin & Berdo, P.C.

(57) ABSTRACT

Provided is an electric vehicle battery transportation container having a shield sleeve, a ratchet which tightens a belt to fix an electric vehicle battery to a seat base in a state in which a battery fixing hook connected to a leading end portion of the ratchet accommodated in a ratchet accommodation recess part formed in the seat base is inserted into an assembly hole formed in a lower bracket of the electric vehicle battery loaded on the seat base, one or more foldable anti-slip parts installed on the seat base stand upright to prevent left-right slip and front-rear slip of the electric vehicle battery at the same time, and a corner support shaft formed with an inclined structure having a decreasing inner diameter and unevenly coupled to a support shaft insertion groove to load seat bases on a transportation vehicle in multiple stages.

7 Claims, 9 Drawing Sheets

ELECTRIC VEHICLE BATTERY TRANSPORTATION CONTAINER HAVING SHIELD SLEEVE

CROSS-REFERENCE TO RELATED APPLICATION

This application claims priority to and the benefit of Korean Patent Application No. 10-2021-0099208, filed on Jul. 28, 2021, the disclosure of which is incorporated herein by reference in its entirety.

BACKGROUND

1. Field of the Invention

The present invention relates to a container, and more specifically, to an electric vehicle battery transportation container having a shield sleeve.

2. Discussion of Related Art

The present inventor (or applicant) has developed an electric vehicle battery transportation container disclosed in Patent Document 1 for transportation and storage of an available electric vehicle battery or disposal or recycling of a used electric vehicle battery.

The electric vehicle battery transportation container according to Patent Document 1 has an advantage that an electric vehicle battery can be stably fixed to a seat base to correspond to a change in width according to a shape of the electric vehicle battery manufactured in a different shape according to a type of vehicle.

However, in the electric vehicle battery transportation container according to Patent Document 1, since the seat base on which the electric vehicle battery is loaded is manufactured in a plate shape having a closed upper surface, there is a disadvantage that the seat base is heavy, and thus, when the seat base is loaded on and transported by a transportation vehicle or vessel, since the seat base is heavy, a transportation cost increases.

In addition, when the electric vehicle battery transportation container according to Patent Document 1 is used for overseas export, since there is no shield function, an electric vehicle battery loaded on the seat base may be contaminated by dust, foreign matters, or the like when transported for a long time in a state in which the electric vehicle battery is exposed in forward, rearward, leftward, and rightward directions, that is, four lateral directions.

Meanwhile, in the electric vehicle battery transportation container according to Patent Document 1, when a belt is tightened to fix the electric vehicle battery to the seat base using a ratchet, there is a disadvantage that interference occurs between the belt and an upper surface of the electric vehicle battery, and when the interference between the belt and the upper surface of the electric vehicle battery is severe, damage to the upper surface of the electric vehicle battery may occur.

In addition, in the electric vehicle battery transportation container according to Patent Document 1, since the corresponding electric vehicle battery is fixed using only the belt to correspond to the change in width according to a shape of the electric vehicle battery, when a tightening strength of the belt decreases to an extent that the belt is loosened while the electric vehicle battery is transported, there is a disadvantage that left-right slip of the electric vehicle battery is not prevented at all, and when the left-right slip of the electric vehicle battery is severe, the electric vehicle battery may be separated from the seat base or severely damaged.

On the other hand, in the electric vehicle battery transportation container according to Patent Document 1, when a corner support shaft formed to protrude from a corner portion of the seat base or a post fixedly inserted into the corner support shaft is unevenly coupled to a support shaft insertion groove formed in a lower surface of a corner portion of another seat base in order to stack seat bases in multiple, that is, two or more, stages, a problem that an upper end portion of the corner support shaft or the post is hooked on a lower opening of the corresponding support shaft insertion groove occurs frequently, stacking work of the seat bases is delayed, or accidents in which a hand or finger of an operator is injured by being pinched between the upper end portion of the corner support shaft and the lower opening of the support shaft insertion groove or between the post and the lower opening of the support shaft insertion groove during manual work of fitting and inserting the upper end portion of the corner support shaft or an upper end portion of the post into the lower opening of the support shaft insertion groove frequently occur.

Related Art

Patent Document (Patent Document 0001) KR 10-2201715 B1

SUMMARY OF THE INVENTION

The present invention is directed to providing an electric vehicle battery transportation container having a shield sleeve in which one or more foldable anti-slip parts installed on a seat base manufactured as a grid frame stand upright to prevent left-right slip and front-rear slip of an electric vehicle battery at the same time, a ratchet tightens a belt to fix the electric vehicle battery to the seat base and shield front, rear, left, and right surfaces of the seat base using a foldable shield sleeve in a state, in which a battery fixing hook connected to the ratchet accommodated in a ratchet accommodation recess part formed in the seat base by the belt is inserted into an assembly hole formed in a lower bracket of the electric vehicle battery loaded on the seat base, the foldable shield sleeve in a folded state is stacked and stored on a sleeve stack part formed in a central portion of an upper surface of the grid frame of the seat base in a folded state, and a corner support shaft is unevenly coupled to a support shaft insertion groove formed with an inclined structure having a decreasing inner diameter to load seat bases on a transportation vehicle in multiple stages.

According to an aspect of the present invention, there is provided an electric vehicle battery transportation container having a shield sleeve, including a seat base which is manufactured as a grid frame so that an electric vehicle battery fixedly supported by a lower bracket for assembling with a vehicle is loaded on an upper surface of the seat base and shields front, rear, left, and right surfaces along an edge of the grid frame using a foldable shield sleeve attachable and detachable along the edge of the grid frame, a plurality of support protruding parts disposed a distance from each other and formed to protrude from a central portion of an upper surface of the grid frame of the seat base to support a lower portion of the lower bracket of the electric vehicle battery, one or more anti-slip parts which are installed in central portions of left and right end portions or central portions of front and rear end portions of the upper surface of the grid frame of the seat base, include foldable support plates, rotation of each of which is limited within a range of 90° from a horizontal position to an upright position based on a rotation shaft of a support, and prevent left-right slip and front-rear slip of the electric vehicle battery loaded on the support protruding parts of the seat base when the support plates stand upright and are pressed against a side portion of the electric vehicle battery or a side portion of the lower bracket of the electric vehicle battery, ratchet accommodation recess parts which are formed opposite to each other in two side surfaces of a front half portion or a rear half portion of the grid frame of the seat base, accommodate ratchets therein, and expose battery fixing hooks connected to leading ends of the ratchets through hook through portions connected to the upper surface of the seat base, the ratchets which are fixedly accommodated in the ratchet accommodation recess parts and tighten belts to fix the electric vehicle battery to the seat base in a state in which the battery fixing hooks connected to the belts are exposed to the outside through the hook through portions of the ratchet accommodation recess parts and inserted into assembly holes formed in the lower bracket of the electric vehicle battery loaded on the upper surface of the seat base, a corner support shaft which is formed to protrude from a corner point of the grid frame of the seat base to support and stack a lower portion of another seat base, of which left and right surfaces and a rear surface with reference to a front opening and an upper opening are closed, and in which a rotation shaft pin is inserted into or separated from pin holes formed in the left and right surfaces, and a post which is inserted into and coupled to the corner support shaft through the front opening or the upper opening of the corner support shaft to be rotatable in a foldable manner, in which rotation of the post is limited within a range of 90° from a horizontal position to an upright position based on the rotation shaft pin of the corner support shaft, and which secures a loading space of the electric vehicle battery between seat bases to be stacked on each other when standing upright, and is separated from an inner portion of the corner support shaft.

When the seat bases are stacked in two or more stages, the seat base may be unevenly coupled to the corner support shaft inserted into a support shaft insertion groove formed in a corner portion of a lower surface of the grid frame of the seat base, and the support shaft insertion groove of the seat base may be formed with an inclined structure in which an inner diameter decreases from a lower opening toward an upper blocking plate.

One or more horizontal protruding parts, which are in contact with one side surface of the folded post to maintain a state in which the post is horizontal with the seat base when the post is folded, may be formed on the upper surface of the grid frame of the seat base.

The foldable shield sleeve in a folded state may be stacked and stored on a sleeve stack part formed in a front-rear longitudinal direction of the seat base in a space in which the plurality of support protruding parts are disposed the distance apart from each other and are opposite to each other in the central portion of the upper surface of the grid frame of the seat base.

The anti-slip parts installed in the central portions of the front and rear end portions of the upper surface of the grid frame of the seat base may be accommodated in anti-slip part accommodation recess parts installed in the central portions of the front and rear end portions of the upper surface of the grid frame of the seat base when folded in horizontal positions, and when front surfaces of the support plates of the corresponding anti-slip parts are in contact with horizontal protruding parts formed to protrude from lower surfaces of the anti-slip part accommodation recess parts, rear surfaces of the support plates of the anti-slip parts may remain horizontal with the upper surface of the grid frame of the seat base to form the sleeve stack part, of which a bottom is flat in a front-rear longitudinal direction, in the central portion of the upper surface of the grid frame of the seat base.

The battery fixing hooks connected to the ratchets by the belts may include belt through plates in which belt through holes connected to the belts having adjustable lengths are formed and latches formed to protrude from lower surfaces of the belt through plates and inserted into and hooked by the assembly holes of the lower bracket of the electric vehicle battery.

Stoppers, which are hooked on upper end portions of the left and right surfaces and an upper end portion of the rear surface of the corner support shaft to restrict an insertion depth into the corner support shaft and prevent separation of the post from the corner support shaft, and lift holes, which communicate with the pin holes of the corner support shaft and allow the post to be folded and rotated to the horizontal position, may be formed around a lower end portion of the post.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in more detail with reference to the accompanying drawings.

An electric vehicle battery transportation container having a shield sleeve according to the present invention, which will be described below, is not limited by the embodiments below, and the technical spirit of the present invention will fall within a range in which the present invention is modified and implemented by those skilled in the art without departing from the technical gist defined by the appended claim.

Referring to FIGS. 1 to 5, an electric vehicle battery transportation container 100 having a shield sleeve according to the present invention includes a seat base 110 manufactured as a grid frame, shield sleeves 110a, a plurality of support protruding parts 120, anti-slip parts 130, ratchet accommodation recess parts 140, ratchets 150, corner support shafts 160, and posts 170.

The seat base 110 may be formed as the grid frame so that an electric vehicle battery 200 fixedly supported by a lower bracket 210 for assembly with a vehicle is loaded on an upper surface of the seat base 110 and, for example, may be manufactured as a rectangular grid frame.

Front, rear, left, and right surfaces of the seat base 110 may be shielded along an edge of the grid frame by the foldable shield sleeves 110a which are attachable and detachable along the edge of the grid frame.

Figure 1:
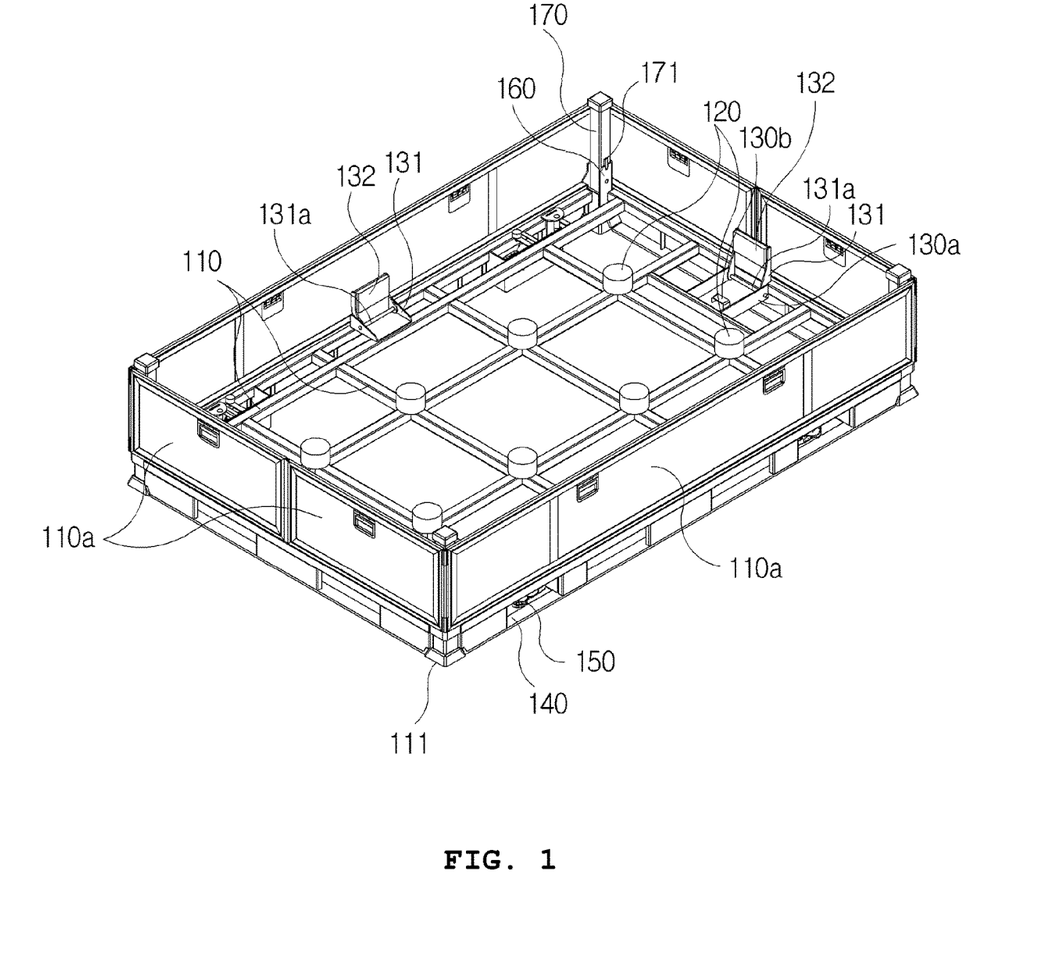
FIG. 1 is a perspective view illustrating a structure of an electric vehicle battery transportation container having a shield sleeve according to the present invention.

For reference, FIG. 1 illustrates a state in which a three-stage foldable shield sleeve 110a shields the left and right surfaces along the edge of the grid frame of the seat base 110 and a two-stage foldable shield sleeve 110a shields the front and rear surfaces along the edge of the grid frame of the seat base 110.

The seat base 110 may be used for transportation or storage of not only an available electric vehicle battery but also a used electric vehicle battery for disposal or recycling and manufactured in a pallet form having an entrance through which forklift blades of a forklift enter.

Figure 5:
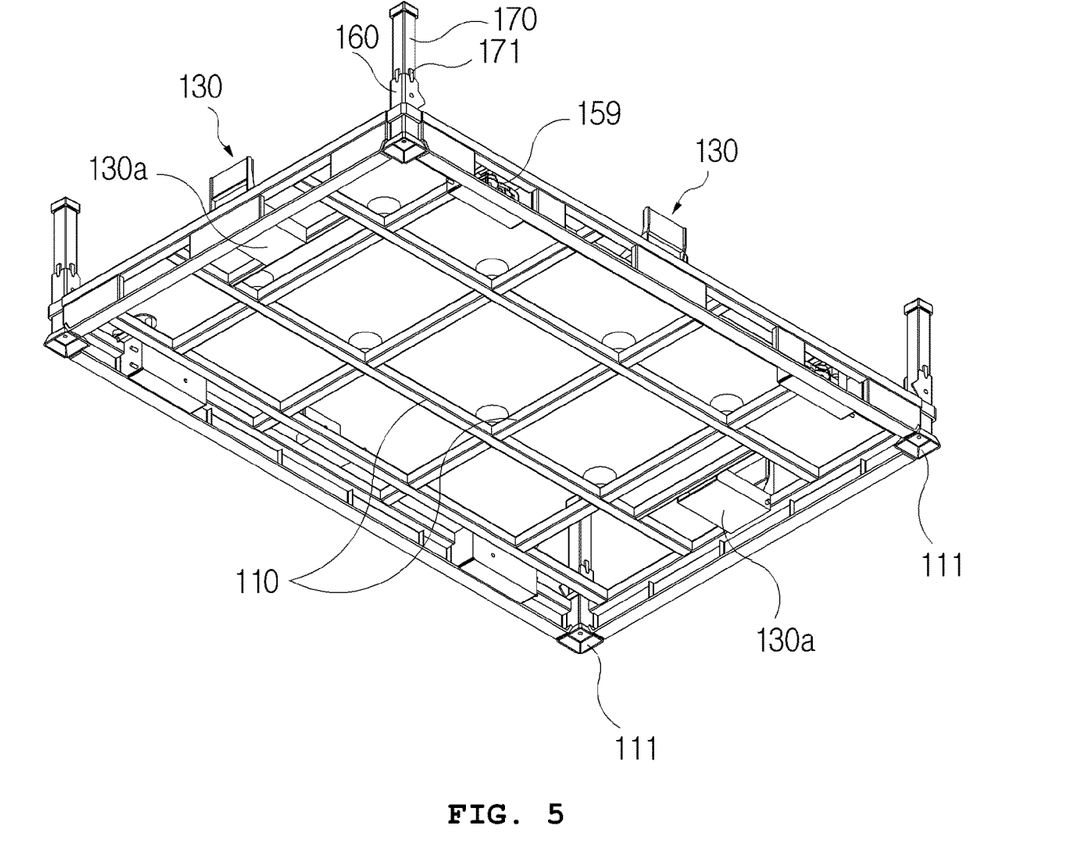
FIG. 5 is a bottom perspective view of FIG. 2.

When seat bases 110 are stacked in two or more stages, the seat base 110 is unevenly coupled to the corner support shafts 160 inserted into support shaft insertion grooves 111 formed in corner portions of a lower surface of the grid frame of the seat base 110.

Each of the support shaft insertion grooves 111 of the seat base 110 may be formed with an inclined structure (for example, a quadrangular pyramid shape of which an upper portion is horizontally cut, a conical shape of which an upper portion is horizontally cut, a triangular pyramid shape of which an upper portion is horizontally cut, a polygonal pyramid shape of which an upper portion is horizontally cut, or the like) in which an inner diameter decreases from a lower opening toward an upper blocking plate, and accordingly, the corner support shafts 160 may be easily inserted into and unevenly coupled to the support shaft insertion grooves 111.

Figure 3:
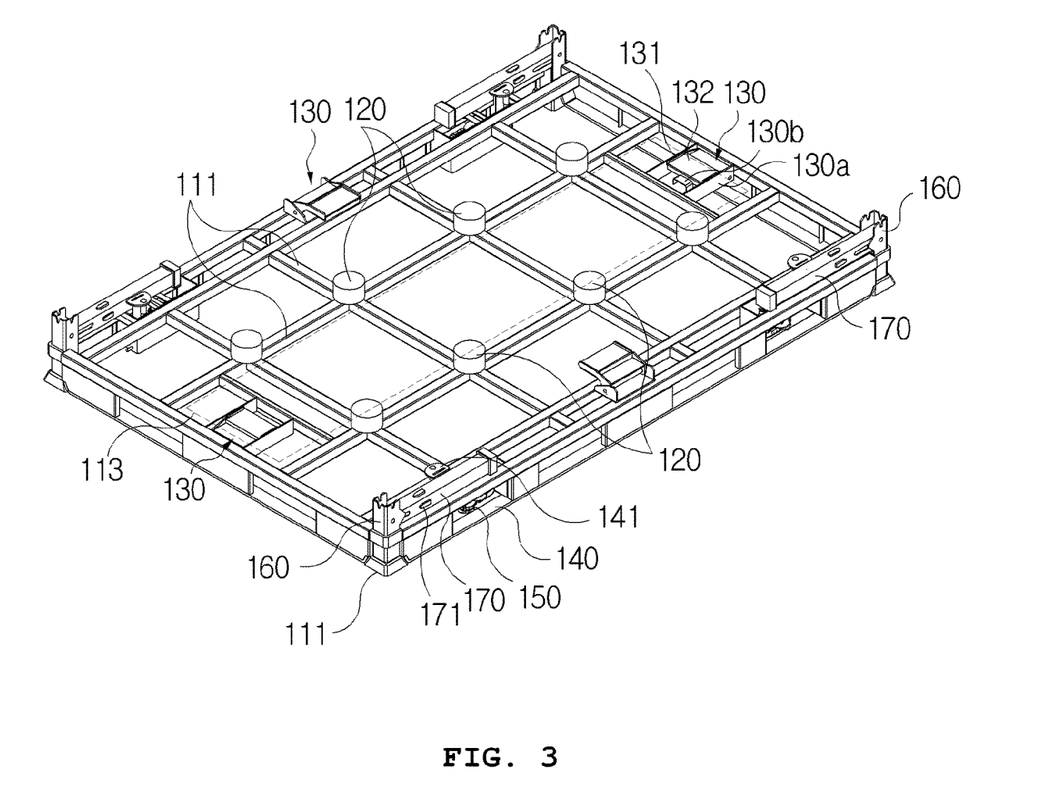
FIG. 3 is a perspective view illustrating a state in which anti-slip parts and posts of FIG. 1 are folded.

One or more horizontal protruding parts 112, which are in contact with one side surfaces of the folded posts 170 to maintain a state in which the posts 170 are horizontal with the seat base 110 when the posts 170 are folded, are formed on an upper surface of the grid frame of the seat base 110.

Figure 4:
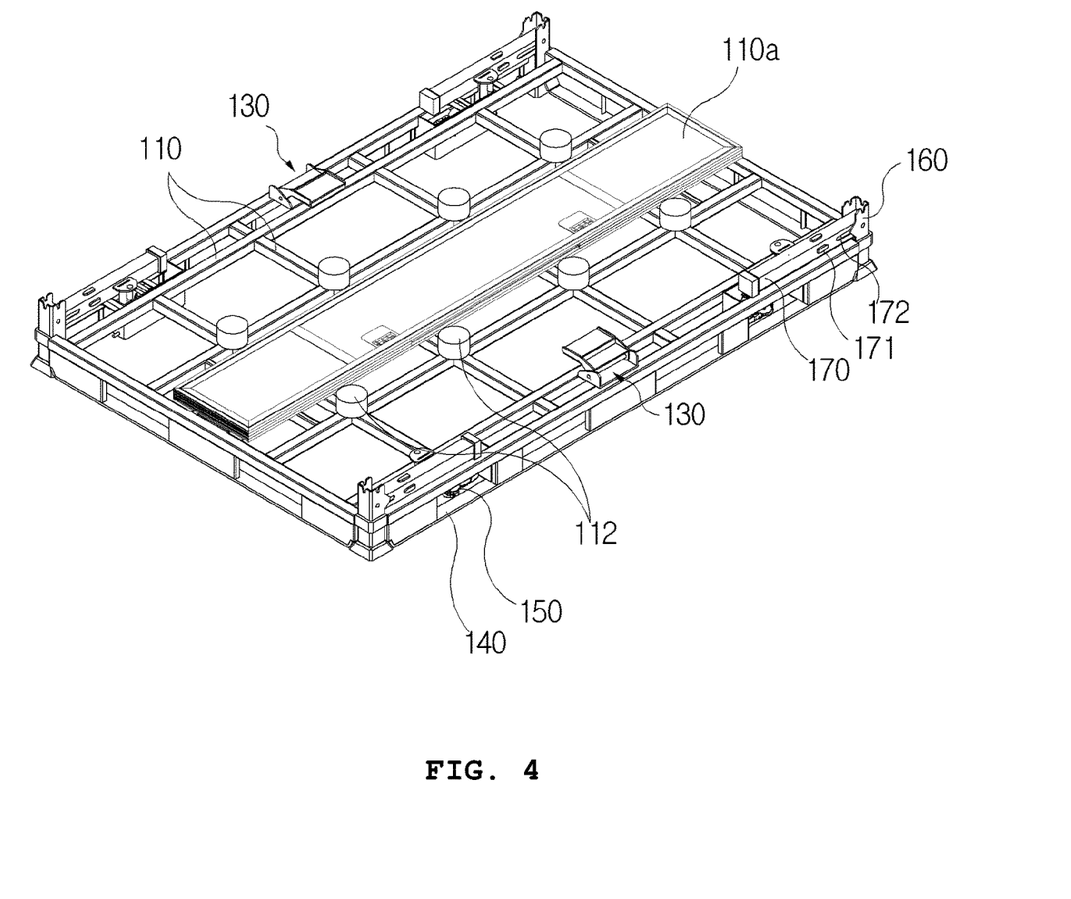
FIG. 4 is an exemplary view illustrating a state in which the foldable shield sleeves in a folded state are stacked and stored on a sleeve stack part of FIG. 3.

As illustrated in FIG. 4, the foldable shield sleeves 110a in a folded state are stacked and stored on a sleeve stack part 113 formed in a front-rear longitudinal direction of the seat base 110 in a space in which the plurality of support protruding parts 120 are disposed a distance apart from each other and are opposite to each other in a central portion of the upper surface of the grid frame of the seat base 110.

Figure 2:
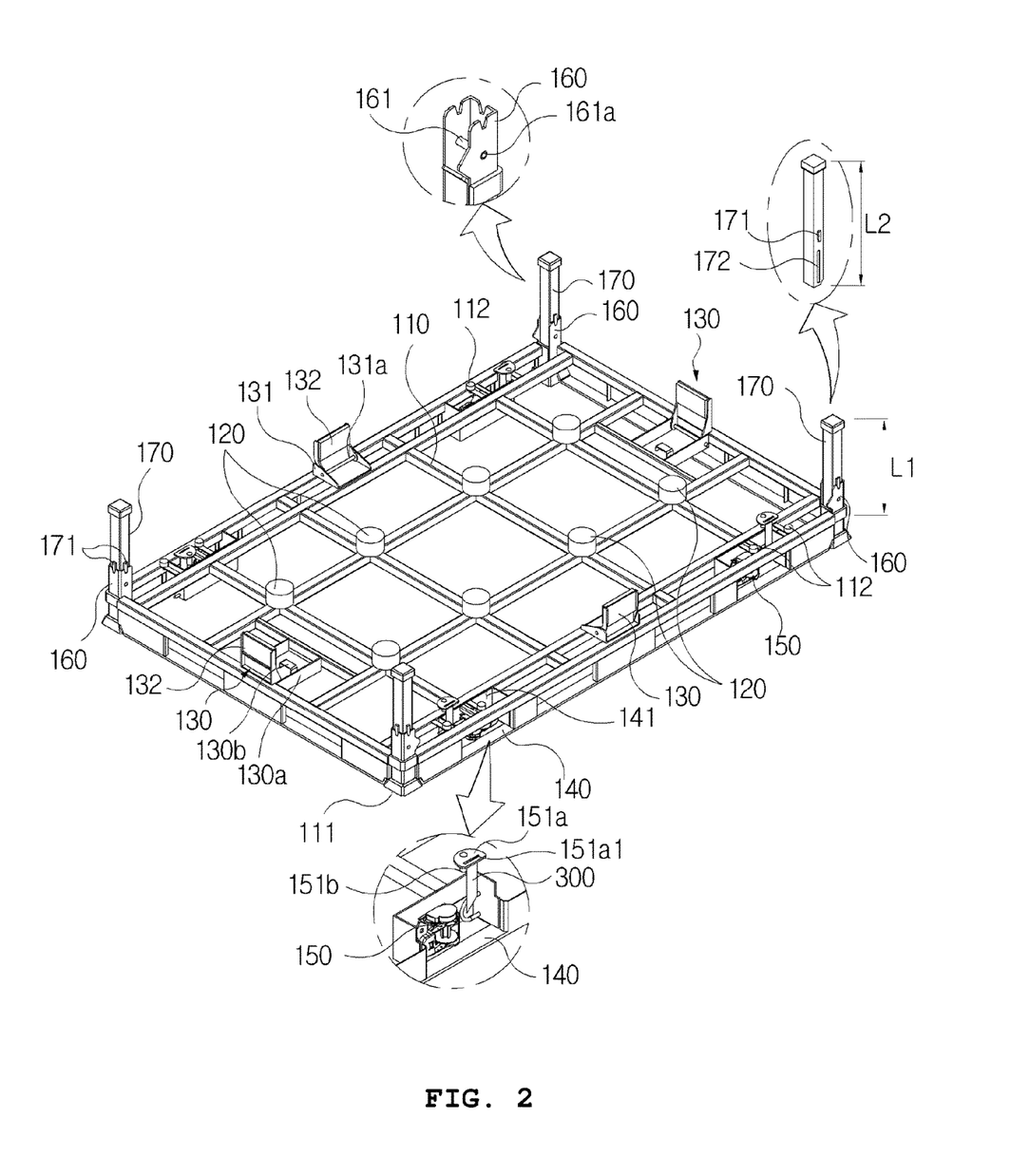
FIG. 2 is a perspective view illustrating a state in which shield sleeves of FIG. 1 are separated.

The plurality of support protruding parts 120 are spaced the distance from each other and formed to protrude from the central portion (for example, a front portion of the central portion, a central portion of the central portion, and a rear portion of the central portion) of the upper surface of the seat base 110 to support a lower portion of the lower bracket 210 of the electric vehicle battery 200.

The plurality of support protruding parts 120 may be pressed against a lower portion of the lower bracket 210 of the electric vehicle battery 200 to prevent static electricity while the electric vehicle battery 200 is transported or stored.

One or more of the anti-slip parts 130 are installed in central portions of left and right end portions or central portions of front and rear end portions of the upper surface of the grid frame of the seat base 110.

For reference, FIG. 2 illustrates one anti-slip part 130 installed in each of central portions of the left and right end portions and central portions of the front and rear end portions of the upper surface of the seat base 110.

The anti-slip parts 130 include foldable support plates 132, rotation of each of which is limited within a range of 90° from a horizontal position to an upright position based on a rotation shaft 131a of a support 131.

When the support plates 132 stand upright and the anti-slip parts 130 are pressed against side portions of the electric vehicle battery 200 or side portions of the lower bracket 210 of the electric vehicle battery 200, left-right slip and front-rear slip of the electric vehicle battery 200 loaded on the support protruding parts 120 of the seat base 110 are prevented at the same time.

As illustrated in FIG. 3, the anti-slip parts 130 installed in the central portions of the left and right end portions of the upper surface of the grid frame of the seat base 110 may be folded toward a central portion of the upper surface of the seat base 110 to maintain a horizontal position with the upper surface of the seat base 110.

In contrast, the anti-slip parts 130 installed in the central portions of the front and rear end portions of the upper surface of the grid frame of the seat base 110 are accommodated in anti-slip part accommodation recess parts 130a installed in the central portions of the front and rear end portions of the upper surface of the grid frame of the seat base 110 when folded in the horizontal position toward the central portion the upper surface of the seat base 110.

In the anti-slip parts 130 accommodated in the anti-slip part accommodation recess parts 130a, when front surfaces of the support plates 132 are in contact with the horizontal protruding parts 130b formed to protrude from lower surfaces of the anti-slip part accommodation recess parts 130a as illustrated in FIGS. 2 and 3, rear surfaces of the support plates 132 of the anti-slip parts 130 remain horizontal with the upper surface of the grid frame of the seat base 110 to form the sleeve stack part 113, of which a bottom is flat in the front-rear longitudinal direction, in the central portion of the upper surface of the grid frame of the seat base 110.

The ratchet accommodation recess parts 140 are formed opposite to each other in two side surfaces of a front half portion or a rear half portion of the grid frame of the seat base 110 to accommodate the ratchets 150.

The ratchet accommodation recess parts 140 expose battery fixing hooks 151 connected to leading ends of the ratchets 150 to the outside through hook through portions 141 connected to the upper surface of the seat base 110.

The ratchets 150 are fixedly accommodated in the ratchet accommodation recess parts 140.

Figure 6:
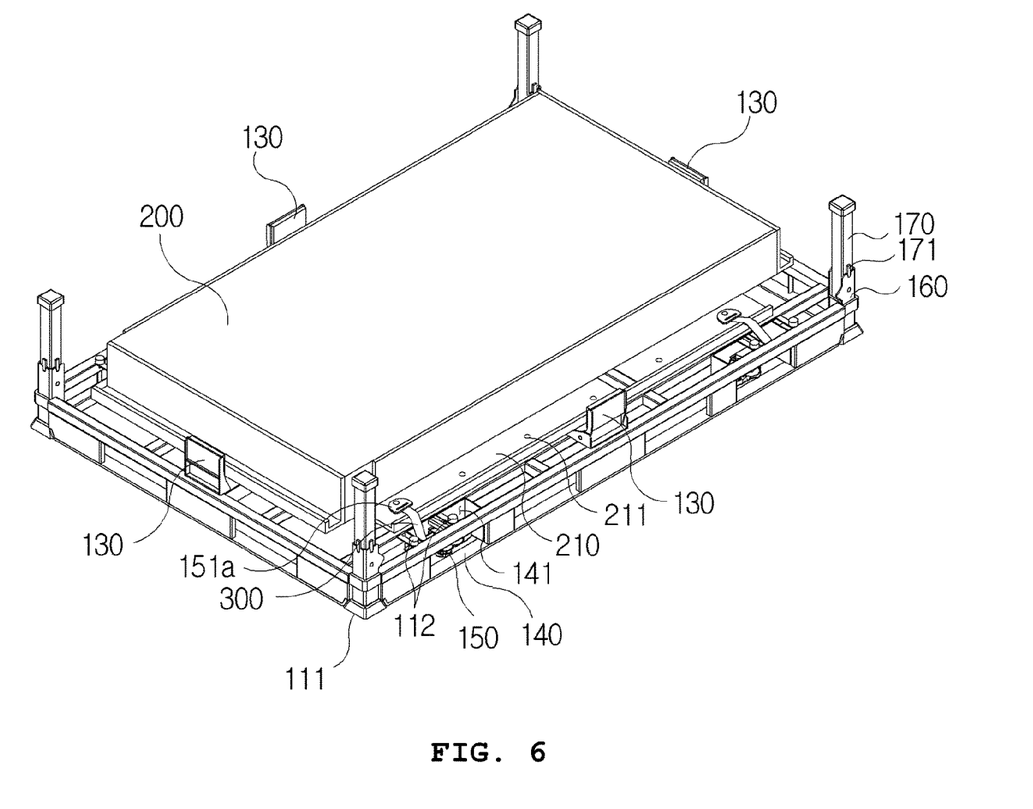
FIG. 6 is an exemplary view illustrating a state in which an electric vehicle battery is fixed to a seat base by belts.

The ratchets 150 tighten the belts 300 to fix the electric vehicle battery 200 to the seat base 110 in a state in which the battery fixing hooks 151 connected to belts 300 are exposed to the outside through the hook through portions 141 of the ratchet accommodation recess parts 140 and inserted into assembly holes 211 formed in the lower bracket 210 of the electric vehicle battery 200 loaded on the upper surface of the seat base 110.

The hook through portions 141 are formed in upper portions of the ratchet accommodation recess parts 140 to be connected to the upper surface of the seat base 110.

For reference, the assembly holes 211 of the lower bracket 210 are formed for assembling the lower bracket 210, which fixedly supports the electric vehicle battery 200, with a vehicle.

The battery fixing hooks 151 connected to the ratchets 150 by the belts 300 include belt through plates 151a in which belt through holes 151a1 connected to the belts 300 having adjustable lengths are formed and latches 151b formed to protrude from lower surfaces of the belt through plates 151a and inserted into and hooked by the assembly holes 211 of the lower bracket 210 of the electric vehicle battery 200.

The lengths of the belts 300 are adjusted in a state in which the belts are wound around winding rolls of the ratchets 150, the lengths increase when the belts are unwound, and when the belts are fully extended and then wound again, the belts return to their original positions.

The corner support shafts 160 are formed to protrude from corner points of the seat base 110 to support and stack a lower portion of another seat base 110.

Left and right surfaces and rear surfaces of the corner support shafts 160 with reference to front openings and upper openings are closed, and rotation shaft pins 161 are inserted into or separated from pin holes 161a formed in the left and right surfaces.

The posts 170 are inserted into and coupled to the corner support shafts 160 through the front openings or the upper openings of the corner support shafts 160 to be rotatable in a foldable manner.

Rotation of each of the posts 170 is limited within a range of 90° from a horizontal position to an upright position based on each of the rotation shaft pins 161 of one of the corner support shafts 160, and when the posts 170 stand upright, a loading space of the electric vehicle battery 200 is secured between the seat bases 110 to be stacked on each other.

The posts 170 are separated from inner portions of the corner support shafts 160.

Stoppers 171, which are hooked on upper end portions of the left and right surfaces and upper end portions of the rear surfaces of the corner support shafts 160 to restrict insertion depths into the corner support shafts 160 and prevent separation of the posts 170 from the corner support shafts 160, and lift holes 172, which communicate with the pin holes 161a of the corner support shafts 160 and allow the posts 170 to be folded and rotated to the horizontal positions, may be formed around lower end portions of the posts 170.

For reference, as illustrated in FIG. 2, when the posts 170, which are inserted into the corner support shafts 160 and coupled to be rotatable by the rotation shaft pins 161, stand upright, the posts 170 move downward along the lift holes 172, the stoppers 171 are hooked on upper end portions of the corner support shafts 160, and thus the rotation shaft pins 161 of the corner support shafts 160 are hooked on upper ends of the lift holes 172.

In contrast, as illustrated in FIG. 3, when the posts 170, which are inserted into the corner support shafts 160 and rotatably coupled to the rotation shaft pins 161, rotate to the horizontal positions, the posts 170 move upward along the lift holes 172, the stoppers 171 are unhooked from the upper end portions of the corner support shafts 160, and thus the rotation shaft pins 161 of the corner support shafts 160 are hooked on lower ends of the lift holes 172, and accordingly, the posts 170 become rotatable to the horizontal positions.

The posts 170 may be inserted into and coupled to the corner support shafts 160 to be folded from the corner support shafts 160 toward an edge of the seat base 110, for example, the edge in a longitudinal direction of the seat base 110 as illustrated in FIG. 3.

When the posts 170 are folded, the posts 170 are in contact with the horizontal protruding parts 112 formed on the upper surface of the seat base 110.

According to an increase or decrease in length of each of the posts 170, a height of the loading space of the electric vehicle battery 200 secured between the seat bases 110 to be stacked on each other is adjusted.

For reference, FIG. 2 illustrates that the posts 170 having a relationship of a length L1>a length L2 are replaceable, and when the posts 170 are replaced, four posts having the length L1 may be replaced with four posts having the length L2 and used.

The electric vehicle battery transportation container 100 having a shield sleeve according to the present invention formed as described above is used as follows.

The electric vehicle battery transportation container 100 including the shield sleeves 110a according to the present invention is used for transportation and storage of the available electric vehicle battery or disposal or recycling of the used electric vehicle battery.

As described above, the seat base 110 according to the present invention may be formed in the pallet form having the entrance through which the forklift blades of the forklift enter, and accordingly, the electric vehicle battery transportation container 100 including the shield sleeves 110a according to the present invention may be moved to and loaded on the vehicle using the forklift in a state in which the electric vehicle battery 200 is loaded on the electric vehicle battery transportation container 100 or transported to another place.

The electric vehicle battery 200 is loaded on the upper surface of the grid frame of the seat base 110 in a state in which the electric vehicle battery 200 is fixedly supported by the lower bracket 210 in which the assembly holes 211 for assembling with the vehicle are formed.

In this case, a user stands the support plates 132 of the anti-slip parts 130 upright and presses the support plates 132 against the side portions of the electric vehicle battery 200 or the side portions of the lower bracket 210 of the electric vehicle battery 200 to prevent left-right slip and front-rear slip of the electric vehicle battery 200 loaded on the support protruding parts 120 of the seat base 110.

As described above, when the electric vehicle battery 200 is loaded on the upper surface of the grid frame of the seat base 110 in a state in which the electric vehicle battery 200 is fixedly supported by the lower bracket 210 in which the assembly holes 211 for assembly with the vehicle are formed, and the left-right slip and the front-rear slip are prevented by the anti-slip parts 130, the corresponding electric vehicle battery 200 is firmly fixed by the ratchets 150.

FIG. 6 illustrates a state in which the electric vehicle battery 200 loaded on the upper surface of the grid frame of the seat base 110 is fixed by the belts 300 and a state in which the support plates 132 of the anti-slip parts 130 stand upright and are pressed against the side portions of the lower bracket 210 of the electric vehicle battery 200 to prevent the left-right slip and the front-rear slip of the electric vehicle battery 200 loaded on the support protruding parts 120 of the seat base 110.

As illustrated in FIG. 6, in order to firmly fix the electric vehicle battery 200 using the ratchets 150, the user releases lock states of the ratchets 150 so that the belts 300 wound around the winding rolls of the ratchets 150 are unwound to increase the lengths of the belts 300.

When the lock states of the ratchets 150 are released, the user pulls the battery fixing hooks 151 connected to the ratchets 150 fixedly accommodated in the ratchet accommodation recess parts 140 by the belts 300 to expose the battery fixing hooks 151 to the outside through the hook through portions 141 of the ratchet accommodation recess parts 140 so that the battery fixing hooks 151 reach the assembly holes 211 formed in the lower bracket 210 of the electric vehicle battery 200 loaded on the upper surface of the grid frame of the seat base 110.

Then, the user tightens the belts 300 using the ratchets 150 to firmly fix the electric vehicle battery 200 to the seat base 110 in a state in which the latches 151b of the battery fixing hooks 151 are inserted into the corresponding assembly holes 211.

When the electric vehicle battery 200 is firmly fixed to the seat base 110, the user maintains the lock states of the ratchets 150 again.

Figure 7:
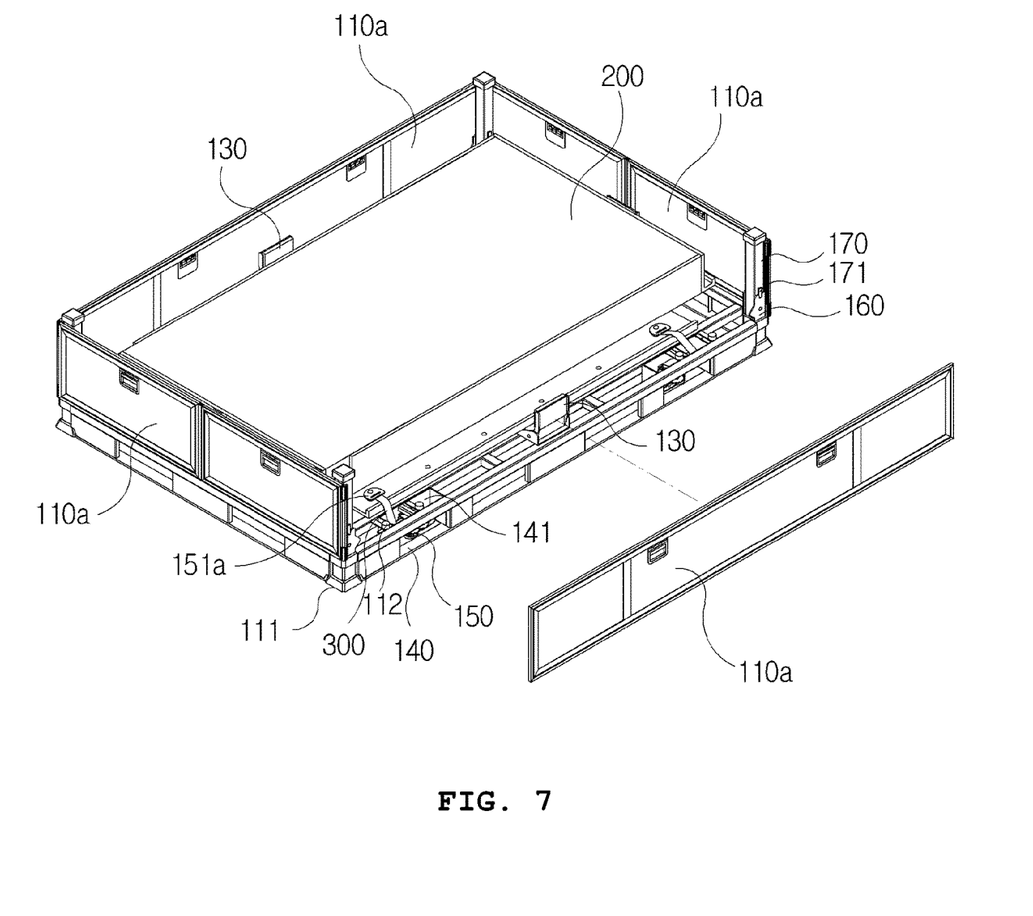
FIG. 7 is an exemplary view illustrating a state in which front, rear, left, and right surfaces are shielded by the foldable shield sleeves along an edge of the seat base of FIG. 6.

FIG. 7 illustrates a state in which the front, rear, left, and right surfaces of the corresponding seat base 110 are shielded by the shield sleeves 110a along the edge of the grid frame of the seat base 110 to which the electric vehicle battery 200 is firmly fixed as illustrated in FIG. 6.

Figure 8:
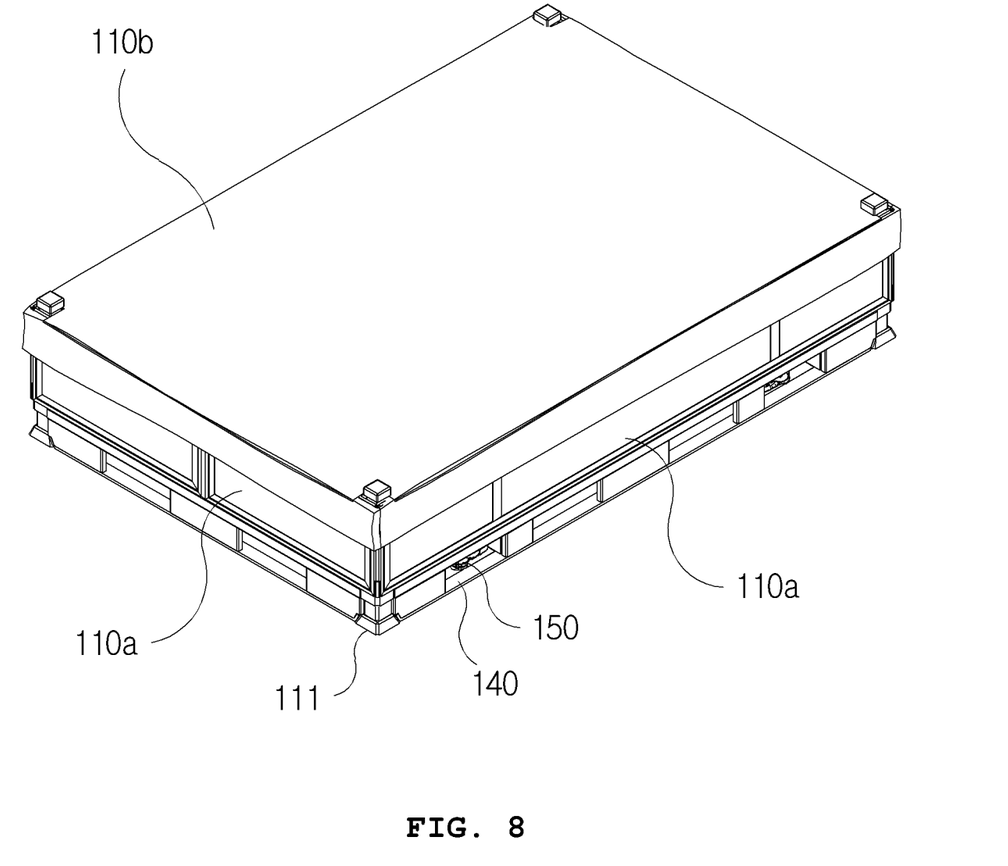
FIG. 8 is an exemplary view illustrating a state in which an upper portion of the seat base illustrated in FIG. 7 is completely covered by a cover.

FIG. 8 illustrates a state in which a cover 110b completely covers an upper portion of the corresponding seat base 110 of which the front, rear, left, and right surfaces are shielded by the shield sleeves 110a as illustrated in FIG. 7. The cover 110b may be formed of a waterproof vinyl material.

Figure 9:
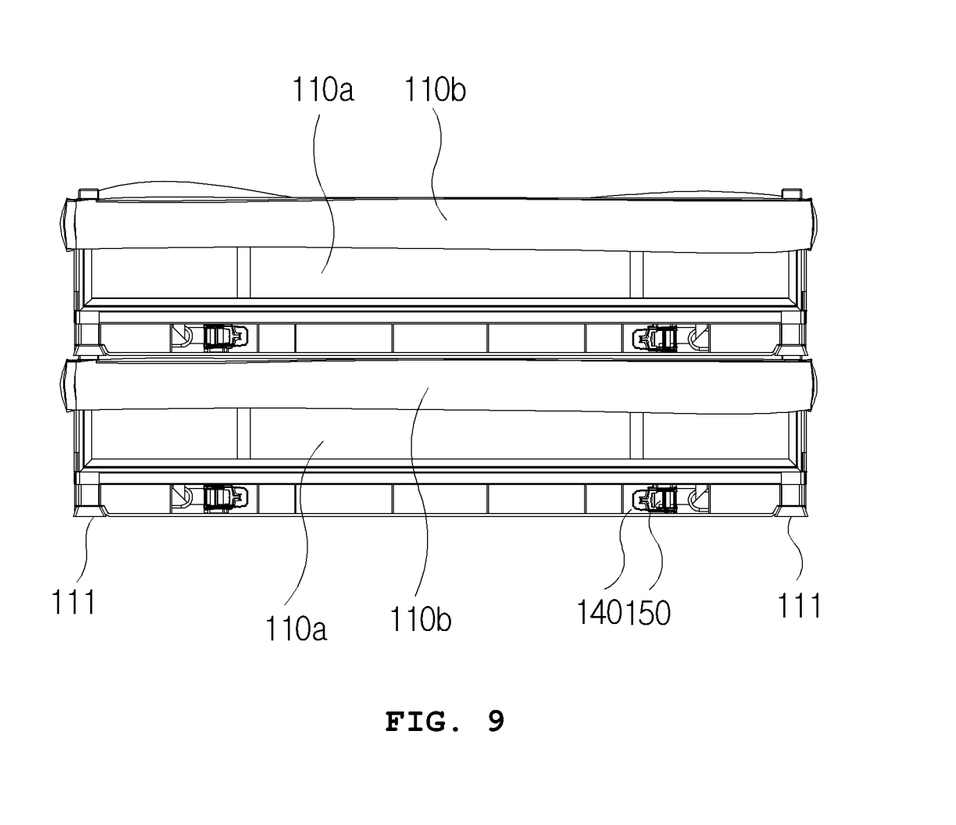
FIG. 9 is an exemplary view illustrating a staking use state of the electric vehicle battery transportation container having a shield sleeve according to the present invention.

FIG. 9 is an exemplary view illustrating a staking use state of electric vehicle battery transportation containers 100 including shield sleeves 110a according to the present invention.

As illustrated in FIG. 9, when the seat bases 110 of the electric vehicle battery transportation containers 100 including the shield sleeves 110a according to the present invention are stacked in two or more stages, the corner support shafts 160 secure the loading space of the electric vehicle battery 200 between the seat bases 110 to be stacked on each other in a state in which the corner support shafts 160 are unevenly coupled to the shaft insertion grooves 111 formed in corner portions of the lower surface of the grid frame of the seat base 110 and stand upright.

In this case, the upper end portions of the posts 170 fixedly inserted into the corner support shafts 160 are unevenly coupled to the support shaft insertion grooves 111 formed in the corner portions of the lower surface of the grid frame of the seat base 110.

As described above, when the seat bases 110 are stacked in two or more stages, the height of the loading space secured between the seat bases 110 to be stacked on each other may be adjusted according to lengths of the posts 170.

The stacking use of the electric vehicle battery transportation container 100 including the shield sleeves 110a according to the present invention may or may not be possible depending on a loading amount of a transportation vehicle.

When the electric vehicle battery transportation container 100 including the shield sleeves 110a according to the present invention can be used, since electric vehicle batteries 200 can be loaded in two or more stages on the transportation vehicle, a transportation cost can be reduced, and a transportation rate can be efficiently improved.

The electric vehicle battery transportation containers 100 including the shield sleeves 110a according to the present invention can be stacked and stored in two or more stages.

For example, as illustrated in FIG. 9, the electric vehicle batteries 200 are not unloaded from the seat bases 110 of which the front, rear, left, and right surfaces are shielded by the shield sleeves 110a and can be conveniently stored in a storage place in the loaded state without being unloaded.

In contrast, after the electric vehicle batteries 200 loaded on the seat bases 110 are unloaded, the electric vehicle battery transportation containers 100, from which the electric vehicle batteries 200 have been unloaded, including the shield sleeves 110a according to the present invention can be stacked in two or more stages and conveniently stored.

In this case, as illustrated in FIG. 3, the anti-slip parts 130 are folded toward a central portion of the seat base 110 to maintain a state in which the anti-slip parts 130 are horizontal with the upper surface of the seat base 110, the posts 170 inserted into the corner support shafts 160 are folded toward the edge of the seat base 110 in the longitudinal direction to be in contact with the horizontal protruding parts 112 of the seat base 110 and maintain a horizontal state, and the upper end portions of the corner support shafts 160 of the seat base 110 illustrated in FIG. 3 are unevenly coupled to support shaft insertion grooves 111 of another seat base 110 which is not illustrated in the drawing.

Particularly, in this case, as illustrated in FIG. 4, the foldable shield sleeves 110a in the folded state are stacked and stored on the sleeve stack part 113.

As shown in the above description, when the seat base 110 is manufactured as the grid frame according to the present invention, a weight of the seat base 110 can be minimized to reduce a transportation cost when the seat base 110 is loaded on and transported by a transportation vehicle or vessel.

In addition, when the electric vehicle battery transportation container 100 including the shield sleeves 110a according to the present invention is used for overseas export, since the front, rear, left, and right surfaces of the seat base 110 are shielded using the shield sleeves 110a, the electric vehicle battery 200 loaded on the seat base 110 may be prevented from being contaminated by dust, foreign matters, or the like when transported for a long time.

Meanwhile, when the foldable anti-slip parts 130 stand upright according to the present invention, left-right slip and front-rear slip of the electric vehicle battery 200 can be prevented at the same time.

In addition, when the belts 300 are tightened by the ratchets 150 when the electric vehicle battery 200 is fixed to the seat base 110 according to the present invention in a state in which the battery fixing hooks 151 are inserted into the assembly holes 211 formed in the lower bracket 210 of the electric vehicle battery 200, the electric vehicle battery 200 can be firmly fixed to the seat base 110 without interference between the belts 300 and an upper surface of the electric vehicle battery 200.

On the other hand, according to the present invention, when the seat base 110 is stacked in one or two or more stages, since the upper end portions of the corner support shafts 160 or the upper end portions the posts 170 can be easily inserted into and unevenly coupled to the support shaft insertion grooves 111 formed as the structures having the decreasing inner diameters as described above, stacking work of the seat bases 110 can be safely and quickly performed without a hand or finger of an operator being injured by being pinched between the upper end portions of the corner support shafts 160 and the lower openings of the support shaft insertion grooves 111 or between the upper end portions of the posts 170 and the lower openings of the support shaft insertion grooves 111.

According to the present invention, when a seat base is manufactured as a grid frame, and front, rear, left, and right surfaces of the seat base are shielded by a shield sleeve, a weight of the seat base can be minimized to reduce a transportation cost when the seat base is loaded on and transported by a transportation vehicle or vessel, and contamination due to dust, foreign matters, or the like can be minimized while an electric vehicle battery loaded on the seat base is transported for a long time.

According to the present invention, when a foldable anti-slip part stands upright, left-right slip or front-rear slip of the electric vehicle battery can be easily prevented, and when a ratchet tightens a belt to fix the electric vehicle battery to the seat base in a state in which a battery fixing hook is inserted into an assembly hole formed in a lower bracket of the electric vehicle battery, the electric vehicle battery can be firmly fixed to the seat base without interference between the belt and the upper surface of the electric vehicle battery.

According to the present invention, when seat bases are stacked in multiple stages, since an upper end portion of a corner support shaft or an upper end portion of a post can be easily inserted into and unevenly coupled to a support shaft insertion groove formed with an inclined structure having a decreasing inner diameter, stacking work of the seat bases can be safely and quickly performed without a hand or finger of an operator being injured by being pinched between the upper end portion of the corner support shaft and a lower opening of the support shaft insertion groove or between the upper end portion of the post and the lower opening of the support shaft insertion groove.

What is claimed is:

1. An electric vehicle battery transportation container having a shield sleeve, comprising:
    a seat base (110) which is manufactured as a grid frame so that an electric vehicle battery (200) fixedly supported by a lower bracket (210) for assembling with a vehicle is loaded on an upper surface of the seat base (110) and shields front, rear, left, and right surfaces along an edge of the grid frame using a foldable shield sleeve (110a) attachable and detachable along the edge of the grid frame;
    a plurality of support protruding parts (120) spaced a distance from each other and formed to protrude from a central portion of an upper surface of the grid frame of the seat base (110) to support a lower portion of the lower bracket (210) of the electric vehicle battery (200);
    one or more anti-slip parts (130) which are installed in central portions of left and right end portions or central portions of front and rear end portions of the upper surface of the grid frame of the seat base (110), include foldable support plates (132), rotation of each of which is limited within a range of 90° from a horizontal position to an upright position based on a rotation shaft (131a) of a support (131), and prevent left-right slip and front-rear slip of the electric vehicle battery (200) loaded on the support protruding parts (120) of the seat base (110) when the support plates (132) stand upright and are pressed against a side portion of the electric vehicle battery (200) or a side portion of the lower bracket (210) of the electric vehicle battery (200);
    ratchet accommodation recess parts (140) which are formed opposite to each other in two side surfaces of a front half portion or a rear half portion of the grid frame of the seat base (110), accommodate ratchets (150) therein, and expose battery fixing hooks (151) connected to leading ends of the ratchets (150) through hook through portions (141) connected to the upper surface of the seat base (110);
    the ratchets (150) which are fixedly accommodated in the ratchet accommodation recess parts (140) and tighten belts (300) to fix the electric vehicle battery (200) to the seat base (110) in a state in which the battery fixing hooks (151) connected to the belts (300) are exposed to an outside through the hook through portions (141) of the ratchet accommodation recess parts (140) and inserted into assembly holes (211) formed in the lower bracket (210) of the electric vehicle battery (200) loaded on the upper surface of the seat base (110);
    a corner support shaft (160) which is formed to protrude from a corner point of the grid frame of the seat base (110) to support and stack a lower portion of another seat base (110), of which left and right surfaces and a rear surface with reference to a front opening and an upper opening are closed, and in which a rotation shaft pin (161) is inserted into or separated from pin holes (161a) formed in the left and right surfaces; and
    a post (170) which is inserted into and coupled to the corner support shaft (160) through the front opening or the upper opening of the corner support shaft (160) to be rotatable in a foldable manner, in which rotation of the post (170) is limited within a range of 90° from a horizontal position to an upright position based on the rotation shaft pin (161) of the corner support shaft (160), and which secures a loading space of the electric vehicle battery (200) between seat bases (110) to be stacked on each other when standing upright, and is separated from an inner portion of the corner support shaft (160).

2. The electric vehicle battery transportation container of claim 1, wherein, when the seat bases (110) are stacked in two or more stages:
    the seat base (110) is unevenly coupled to the corner support shaft (160) inserted into a support shaft insertion groove (111) formed in a corner portion of a lower surface of the grid frame of the seat base (110); and
    the support shaft insertion groove (111) of the seat base (110) is formed with an inclined structure in which an inner diameter decreases from a lower opening toward an upper blocking plate.

3. The electric vehicle battery transportation container of claim 1, wherein one or more horizontal protruding parts (112), which are in contact with one side surface of the folded post (170) to maintain a state in which the post (170) is horizontal with the seat base (110) when the post (170) is folded, are formed on the upper surface of the grid frame of the seat base (110).

4. The electric vehicle battery transportation container of claim 1, wherein the foldable shield sleeve (110a) in a folded state is stacked and stored on a sleeve stack part (113) formed in a front-rear longitudinal direction of the seat base (110) in a space in which the plurality of support protruding parts (120) are disposed the distance apart from each other and are opposite to each other in the central portion of the upper surface of the grid frame of the seat base (110).

5. The electric vehicle battery transportation container of claim 1, wherein:
    the anti-slip parts (130) installed in the central portions of the front and rear end portions of the upper surface of the grid frame of the seat base (110) are accommodated in anti-slip part accommodation recess parts (130a)

installed in the central portions of the front and rear end portions of the upper surface of the grid frame of the seat base (110) when folded in horizontal positions; and when front surfaces of the support plates (132) of the corresponding anti-slip parts (130) are in contact with horizontal protruding parts (130b) formed to protrude from lower surfaces of the anti-slip part accommodation recess parts (130a), rear surfaces of the support plates (132) of the anti-slip parts (130) remain horizontal with the upper surface of the grid frame of the seat base (110) to form the sleeve stack part (113), of which a bottom is flat in a front-rear longitudinal direction, in the central portion of the upper surface of the grid frame of the seat base (110).

6. The electric vehicle battery transportation container of claim 1, wherein the battery fixing hooks (151) connected to the ratchets (150) by the belts (300) include belt through plates (151a) in which belt through holes (151a1) connected to the belts (300) having adjustable lengths are formed and latches (151b) formed to protrude from lower surfaces of the belt through plates (151a) and inserted into and hooked by the assembly holes (211) of the lower bracket (210) of the electric vehicle battery (200).

7. The electric vehicle battery transportation container of claim 1, wherein:
   stoppers (171), which are hooked on upper end portions of the left and right surfaces and an upper end portion of the rear surface of the corner support shaft (160) to restrict an insertion depth into the corner support shaft (160) and prevent separation of the post (170) from the corner support shaft (160), are formed around a lower end portion of the post (170); and
   lift holes (172), which communicate with the pin holes (161a) of the corner support shaft (160) and allow the post (170) to be folded and rotated to the horizontal position, are formed around the lower end portion of the post (170).

* * * * *